United States Patent
Fujita

(10) Patent No.: US 7,438,967 B2
(45) Date of Patent: Oct. 21, 2008

(54) CERAMIC HONEYCOMB STRUCTURAL BODY

(75) Inventor: Yuki Fujita, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 0 days.

(21) Appl. No.: 11/618,026

(22) Filed: Dec. 29, 2006

(65) Prior Publication Data

US 2007/0190289 A1    Aug. 16, 2007

Related U.S. Application Data

(63) Continuation of application No. PCT/JP2006/301903, filed on Jan. 30, 2006.

(30) Foreign Application Priority Data

Feb. 4, 2005   (JP) ............................... 2005-28942

(51) Int. Cl.
    B32B 3/12    (2006.01)
(52) U.S. Cl. ...................... 428/116; 428/117
(58) Field of Classification Search .............. 428/116, 428/117, 119, 304.4, 73, 327; 55/523; 156/293, 156/252, 253, 278, 280, 294; 501/118, 119, 501/120, 153, 154
    See application file for complete search history.

(56) References Cited

U.S. PATENT DOCUMENTS

| 4,455,180 A | * | 6/1984 | Hillman et al. ............. 264/631 |
| 4,946,487 A | | 8/1990 | Butkus |
| 5,914,187 A | | 6/1999 | Naruse et al. |
| 6,669,751 B1 | | 12/2003 | Ohno et al. |
| 2004/0055265 A1 | | 3/2004 | Ohno et al. |
| 2004/0101654 A1 | * | 5/2004 | Hijikata ..................... 428/116 |
| 2004/0161596 A1 | | 8/2004 | Taoka et al. |
| 2005/0076626 A1 | | 4/2005 | Kudo et al. |
| 2005/0109023 A1 | | 5/2005 | Kudo et al. |
| 2005/0153099 A1 | | 7/2005 | Yamada |
| 2005/0160710 A1 | | 7/2005 | Taoka et al. |
| 2005/0161849 A1 | | 7/2005 | Ohno et al. |
| 2005/0169819 A1 | | 8/2005 | Shibata |
| 2005/0175514 A1 | | 8/2005 | Ohno |
| 2005/0178098 A1 | | 8/2005 | Ono et al. |

(Continued)

FOREIGN PATENT DOCUMENTS

EP   219383   4/1987

(Continued)

OTHER PUBLICATIONS

International Preliminary Report on Patentability, PCT/JP2006/301903, mailed Aug. 16, 2006 (English translation included).

*Primary Examiner*—Jennifer McNeil
*Assistant Examiner*—Gordon R Baldwin
(74) *Attorney, Agent, or Firm*—Ditthavong Mori & Steiner, P.C.

(57) ABSTRACT

In the ceramic honeycomb structural body comprised of an assembly formed by assembling and integrating a plurality of pillar-shaped porous honeycomb ceramic members, each member comprising numbers of cells juxtaposed in parallel to the longitudinal direction and defined by cell walls, the cross section area perpendicular to the longitudinal direction at each end portion of the members is made larger than that at the center portion of the member.

15 Claims, 4 Drawing Sheets

U.S. PATENT DOCUMENTS

| | | |
|---|---|---|
| 2005/0180898 A1 | 8/2005 | Yamada |
| 2005/0229565 A1 | 10/2005 | Yoshida |
| 2005/0247038 A1 | 11/2005 | Takahashi |
| 2005/0272602 A1 | 12/2005 | Ninomiya |
| 2006/0021310 A1 | 2/2006 | Ohno et al. |
| 2006/0051556 A1 | 3/2006 | Ohno et al. |
| 2006/0105139 A1 | 5/2006 | Suwabe et al. |
| 2006/0166820 A1 | 7/2006 | Ogyu et al. |
| 2006/0172113 A1 | 8/2006 | Kunieda |
| 2006/0210765 A1 | 9/2006 | Ohno et al. |
| 2006/0216466 A1 | 9/2006 | Yoshida |
| 2006/0216467 A1 | 9/2006 | Yoshida |
| 2006/0222812 A1 | 10/2006 | Koyama et al. |
| 2006/0225390 A1 | 10/2006 | Yoshida |
| 2006/0230732 A1 | 10/2006 | Kunieda |
| 2007/0020155 A1 | 1/2007 | Ohno et al. |
| 2007/0068128 A1 | 3/2007 | Oshimi et al. |
| 2007/0128405 A1 | 6/2007 | Sakaguchi et al. |
| 2007/0130897 A1 | 6/2007 | Sakaguchi et al. |
| 2007/0158870 A1 | 7/2007 | Suwabe et al. |
| 2007/0169453 A1 | 7/2007 | Hayakawa |
| 2007/0178275 A1 | 8/2007 | Takahashi |
| 2007/0190350 A1 | 8/2007 | Ohno et al. |
| 2007/0196620 A1 | 8/2007 | Ohno et al. |
| 2007/0212517 A1 | 9/2007 | Ohno et al. |
| 2007/0293392 A1 | 12/2007 | Ohno et al. |

FOREIGN PATENT DOCUMENTS

| | | |
|---|---|---|
| EP | 0369330 | 5/1990 |
| EP | 1 533 032 A1 | 6/2003 |
| EP | 1479881 | 11/2004 |
| EP | 1 550 494 A1 | 7/2005 |
| FR | 2587026 | 3/1987 |
| JP | 8-217565 | 8/1996 |
| JP | 8-281036 | 10/1996 |
| JP | 9-249458 | 9/1997 |
| JP | 2000-279729 | 10/2000 |
| JP | 2000-351614 | 12/2000 |
| JP | 2001-138416 | 5/2001 |
| JP | 2003-165765 | 6/2003 |
| WO | WO 03/106028 A1 | 12/2003 |
| WO | PCT/JP2006/301903 | 4/2006 |
| WO | WO 2006/035822 A1 | 4/2006 |
| WO | WO 2006/035823 A1 | 4/2006 |
| WO | WO 2006/041174 A1 | 4/2006 |
| WO | WO 2006/057344 A1 | 6/2006 |

* cited by examiner

CERAMIC HONEYCOMB STRUCTURAL BODY

CROSS REFERENCE TO RELATED APPLICATION

The present application is based on an International application No.PCT/JP2006/301903 filed on Jan. 30, 2006, claiming a priority of Japanese patent application No. 2005-28942 filed on Feb. 4, 2005. The contents of these applications are incorporated herein by reference in its entirety.

TECHNICAL FIELD

The present invention relates to a ceramic honeycomb structural body.

BACKGROUND ART

Exhaust gas exhausted from internal combustion engines of vehicles such as buses, trucks or construction machines contains particulate and noxious gas having a noxious influence on environments and human bodies. Therefore, in recent years, there is proposed techniques for collecting and removing the particulate from exhaust gas. One of these techniques provides a ceramic structural body used as a filter for purifying the exhaust gas. This ceramic structural body comprises a honeycomb structural porous ceramic member, and embodied as a ceramic honeycomb filter for collecting and removing particulates from exhaust gas.

The ceramic filter uses, as shown in FIG. 1A, a ceramic honeycomb structural body 10 which is formed by assembling and integrating a plurality of rectangular pillar-shaped porous ceramic members (units) 10 with each other by interposing seal layers 14 as a ceramic block and the outer surface of the ceramic block is covered with seal layers 16 for preventing exhaust gas from leakage. This ceramic honeycomb structural body 10 makes the ceramic member (unit) 11 having the pillar-shaped honeycomb structure as one construction unit and these plural members are bound together to be formed into circular, oval or polygonal shape in section.

As shown in FIG. 1A, in respective ceramic members 11 are provided numbers of cells 12 as exhaust gas passages through the cell walls 13. And, in case of using the ceramic honeycomb structural body 10 as an exhaust gas purifying filter, ends of the cells 12 are mainly plugged alternately with plugging for collecting particulates in exhaust gas on the cell walls 13 when the exhaust gas flowed into the cells 12 passes (wall flow) through the cell walls 13.

As described above, the reason of constructing the ceramic honeycomb structural body (filter) by binding a plurality of pillar-shaped ceramic members is as follows. That is, when a ceramic honeycomb structural body is made large by integrally molding, even if silicon carbide having high heat resistance, excellent mechanical characteristics and large thermal conductivity is used as a ceramic member, temperature difference is generated in the ceramic honeycomb structural body by temperature change and local heat generation of exhaust gas, and the ceramic honeycomb structural body tends to be cracked by thermal expansion difference due to this temperature difference. Therefore, this filter is made by assembling a plurality of ceramic members (units), and respective ceramic members (units) are adhered to each other by interposing seal layers to form an assembly to relax thermal stress acted on the filter.

Then, there has been proposed in Japanese unexamined patent publication No. 2001-138416 (JP-A-2001-138416) that unevenness or waviness of about 0.2 mm to 1.5 mm in flatness is given to the outer wall as a joining face of each honeycomb segment (ceramic member).

The contents of JP-A-2001-138416 are incorporated herein by reference in its entirety.

BRIEF SUMMARY OF THE INVENTION

According to one embodiment of the present invention, there is provided a ceramic honeycomb structural body comprised of an assembly formed by binding and integrating a plurality of pillar-shaped porous honeycomb ceramic members each having number of cells, juxtaposed to each other in parallel relationship in the longitudinal direction and defined by cell walls, wherein a cross section area perpendicular to the longitudinal direction at each end portion of the porous honeycomb ceramic member is made larger than that at the center portion in the longitudinal direction of the member.

Further, in the ceramic honeycomb structural body according to the embodiment of the present invention, it is preferable that an end region including each end portion of the member having larger cross section area than that of the center portion of the member is defined to be a region which locates within a range of about 0.5% to about 25% length in the longitudinal direction from each end face, and it is preferable that the cross section area of each end portion of the member is about 1.01 times to about 1.10 times larger than that of the center portion of the member in the longitudinal direction, and it is preferable that the member comprises more than one selected from aluminum nitride, silicon nitride, boron nitride, titanium nitride, silicon carbide, zirconium carbide, titanium carbide, tantalum carbide, tungsten carbide, alumina, zirconia, cordierite, mullite and aluminum titanate, and it is preferable that a shape of cross section area at each end portion of the member is one of triangle, square and hexagon, and it is preferable that a shape of cross section area at the center portion of the member is the same as that of each end portion of the member.

Moreover, the ceramic honeycomb structural body according to the embodiment of the present invention is preferable to be used as a filter for collecting and removing particulates contained in exhaust gas by plugging either end portion of the cell, or preferable to be used as a catalyst carrier for converting exhaust gas wherein a catalyst component comprising more than one noble metal selected from Pt, Pd and Rh or alloy thereof is to be carried on the cell wall surface.

DETAILED DESCRIPTION OF THE EMBODIMENTS

Figure 1A:
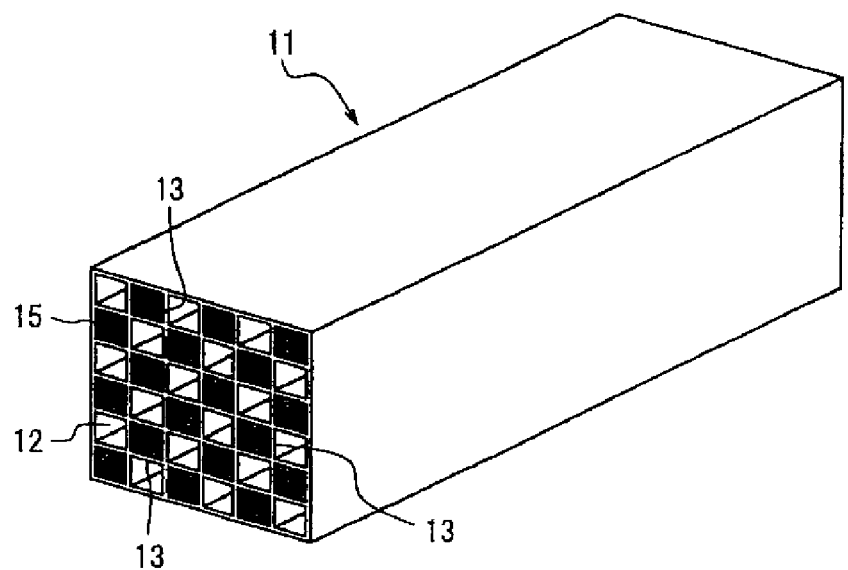
FIG. 1A is a perspective view showing one example of a porous ceramic member.
Figure 1B:
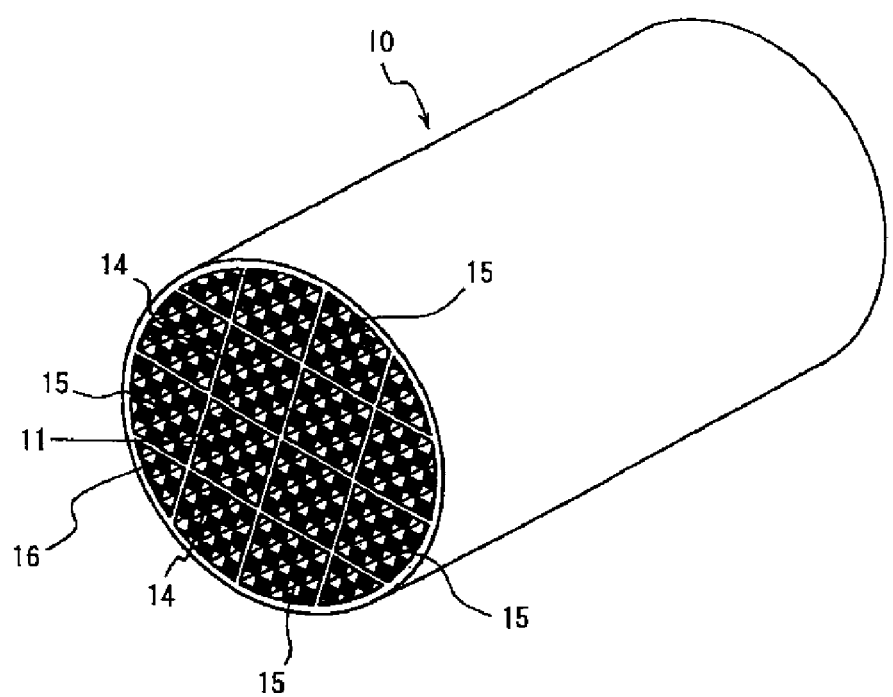
FIG. 1B is a perspective view showing one example of an assembly type ceramic honeycomb filter.
Figure 2A:
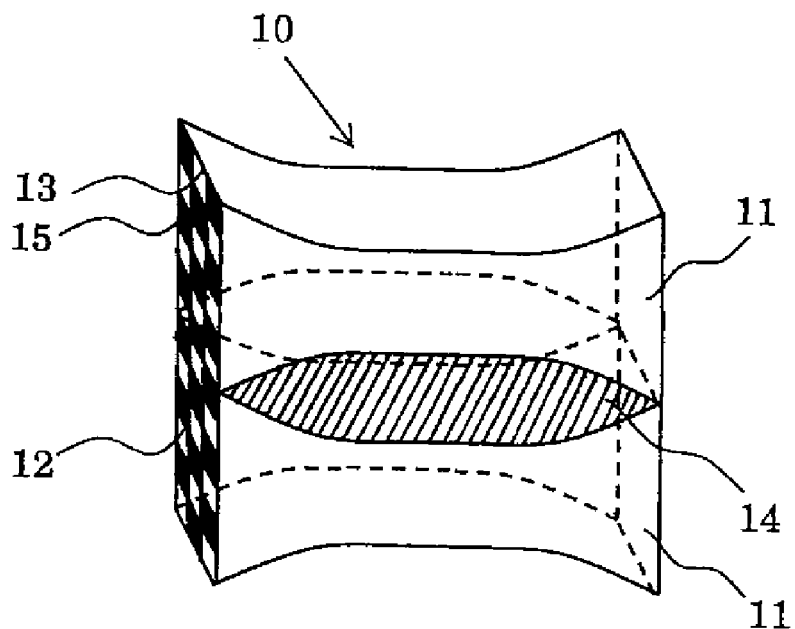
FIG. 2A is a perspective view showing a section in the longitudinal direction of the ceramic honeycomb structural body composed of a plurality of porous honeycomb ceramic members according to one embodiment of the present invention.
Figure 2B:
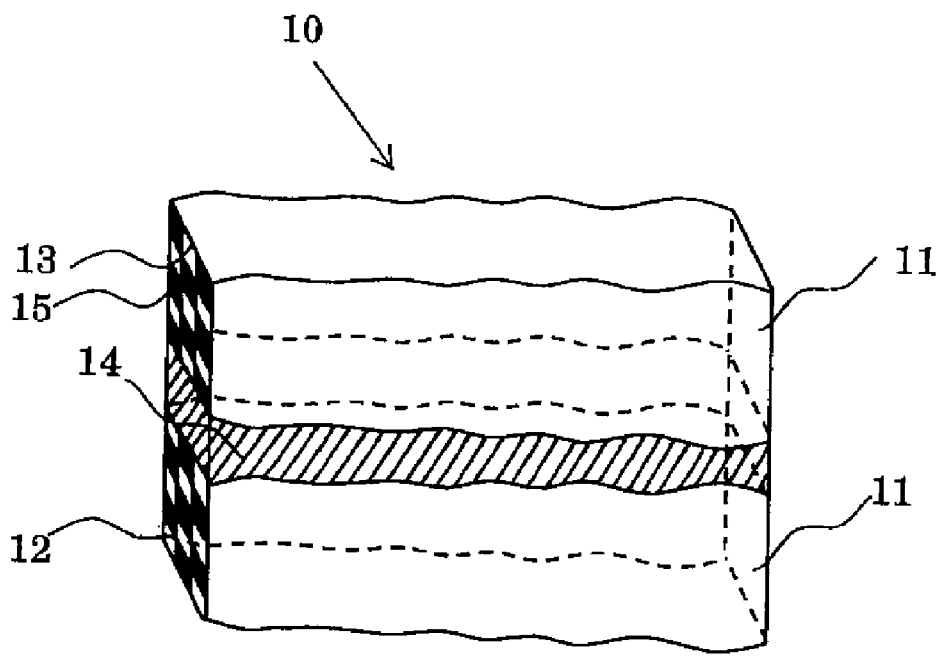
FIG. 2B is a perspective view showing a section in the longitudinal direction of the conventional ceramic honeycomb structural body.

FIG. 2A is a sectional view of a porous honeycomb ceramic member 11 (hereinafter simply referred to as "ceramic member") taken along the longitudinal direction. As shown in FIG. 2A, a honeycomb structural body 10 according to one embodiment of the present invention is, for example, of such structure that the cross section area perpendicular to the longitudinal direction at each end of the rectangular pillar-shaped ceramic member 11 is larger than that at the center portion in the longitudinal direction and the ceramic members 11 adjacent at both ends are closely adhered to each other. And, mainly, in a space produced at the portion close to the center of the longitudinal direction between the adjacent ceramic members 11 is formed a seal layer 14 by interposing sealing material having an adhering function.

As materials for the seal layer 14, for example, use may be made of an inorganic binder, organic binder, inorganic fiber and/or inorganic particle which is dried, cured and further fired at about 700° C. or more, if necessary.

As the inorganic binder for constructing the seal layer 14, for example, use may be made of silica sol, alumina sol and the like. These may be used singly or more than two jointly. In the above inorganic binders, silica sol is desirable.

As the above organic binder, for example, use may be made of polyvinyl alcohol, methyl cellulose, ethyl cellulose, carboxymethyl cellulose and the like. These may be used singly or more than two jointly. In the above organic binders, methyl cellulose is desirable.

As the above inorganic fiber, for example, use may be made of silica-alumina, mullite, alumina, silica and the like. These may be used singly or more than two jointly. In the above inorganic fibers, silica-alumina fiber is desirable.

As the above inorganic particle, for example, use may be made of carbide, nitride and the like, and concretely, use may be made of inorganic powder or whisker and the like including silicon carbide, silicon nitride, boron nitride and the like. These may be used singly or more than two jointly. In the above inorganic particles, silicon carbide having excellent thermal conductivity is desirable.

The seal layer 14 may be that comprising a dense body, or a porous body which can flow exhaust gas to the inside.

Figure 3:
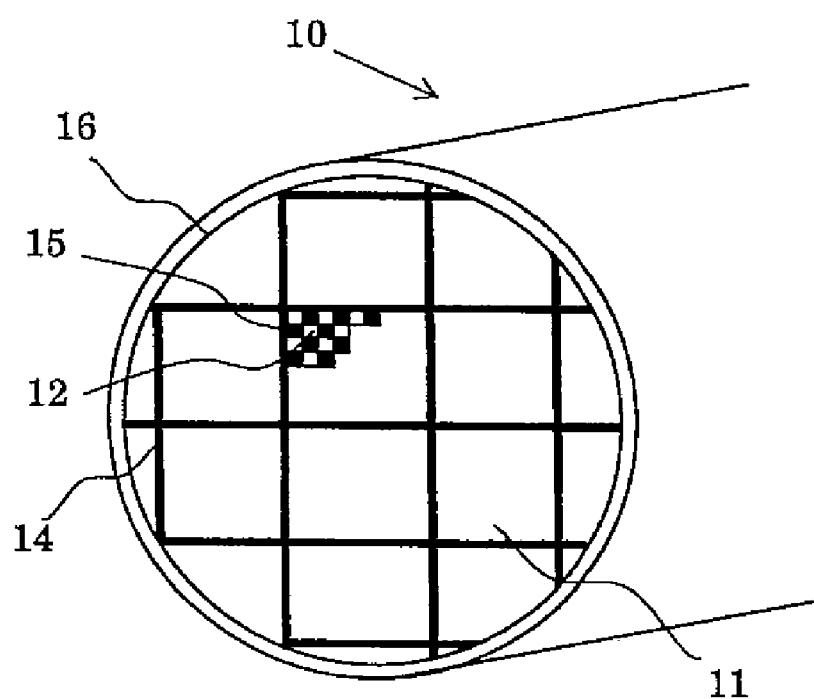
FIG. 3 is a perspective view of the ceramic honeycomb structural body according to the embodiment of the present invention.

The honeycomb structural body 10 is comprised of an assembly formed by assembling a plurality of ceramic members 11 together as above wherein numbers of cells 12 are juxtaposed in parallel to the longitudinal direction as shown in FIG. 3, and in case of using it as a filter, either one end portion of an exhaust gas inlet side or outlet side of the cell 12 is plugged with a plug 15 in the form of checkers for example, and cell walls 13 for separating these cells 12 function as filters.

In this case, exhaust gas flowed from the exhaust gas inlet side end portion of the cell 12 passes through the cell wall 13 because the other end portion is plugged, and particulates are trapped and removed by the cell wall 13, and gas is exhausted by passing through the adjacent cells 12 which end portions are not plugged.

Further, in case of using the ceramic honeycomb structural body according to the embodiment of the present invention as a catalyst carrier, each opening end portion of the ceramic members 11 is not necessarily plugged. Furthermore, On the surface of this cell wall is carried a noble metal catalyst such as Pt, Pd or Rh. In this case, Exhaust gas flowed from the exhaust gas inlet side end portions is converted by such noble metal catalyst and discharged as clean gas from the exhaust gas outlet side end portions.

In addition, the ceramic honeycomb structural body 10 according to the embodiment of the present invention shown in FIG. 3 shows a cylindrical shape of a ceramic block made by assembling and integrating a plurality of ceramic members 11 (unit) together, but it is not limited to cylindrical shape, and for example, oval, polygonal and any other shapes may be used. Further, in the present invention, unevenness or waviness may be imparted to the outer wall as a joining face of each ceramic member 11.

A characteristic of the ceramic honeycomb structural body according to the embodiment of the present invention is to make the cross section area at both end portions of the ceramic member larger than at the center portion of the ceramic member among cross section areas perpendicular to the longitudinal direction (gas passage direction) of the ceramic member. With such structure, there is produced an inclination or different step on the outer wall between the end portion and the center portion to enhance latching function (engagement action) at the inclined portion or different step portion, thereby the effect of preventing the ceramic member from slipping off can be expected.

In the ceramic honeycomb structural body according to the embodiment of the present invention, it is preferable that each end portion having larger cross section area than that at the center portion become continuously small within a range of about 0.5 to about 25% length in the longitudinal direction (inclined portion), or smaller stepwisely (different step portion), respectively. When this range is about 25% length or less, the seal layer portion formed between the ceramic members does not become small and sufficient adhesive strength can be easily obtained.

Further, when this range is about 0.5% length or more, stress concentration to the inclined portion or different step portion is hardly produced so that the breakage thereof hardly occurs.

Further, in the ceramic honeycomb structural body according to the embodiment of the present invention, external form dimension is made, for example, about 10 mm to about 50 mm X about 10 mm to about 50 mm X about 100 mm to about 400 mm. The cross section area perpendicular to the longitudinal direction at each end portion of this ceramic member is preferably about 1.01 to about 1.10 times the cross section area at the center portion in the longitudinal direction. This is because when the cross section area at each end portion is about 1.10 times or less of the cross section area at the center portion, thickness of the center portion of the seal layer formed between the ceramic members does not become thicker as compared with the end portions, so that a filtration area does not become small, and accordingly breakage of the ceramic member and/or seal layer by thermal expansion difference between the ceramic member and the seal layer hardly occurs.

Further, when the cross section area of each end portion of the ceramic member is about 1.01 times or more, inclination or step difference between the end portion and the center portion of the ceramic member becomes large to enhance latching function (engagement action), and accordingly the ceramic members can not easily be slipped off.

Further, in the ceramic honeycomb structural body according to the embodiment of the present invention, as a porous ceramic member, use may be made of the member formed from more than two materials selected from nitride ceramics such as aluminum nitride, silicon nitride, boron nitride or titanium nitride, carbide ceramics such as silicon carbide, zirconium carbide, titanium carbide, tantalum carbide or tungsten carbide, oxide ceramics such as alumina, zirconia, cordierite ormullite, and aluminum titanate. In the present invention, silicon carbide ceramics means silicon carbide having the content of about 60 mass % or more, including a complex of silicon and silicon carbide. Among them, silicon carbide ceramics is preferable because of excellent mechanical characteristics and large thermal conductivity.

The shape of cross section area perpendicular to the longitudinal direction at each end portion of the ceramic member for constructing the above ceramic honeycomb structural body according to the embodiment of the present invention is preferably either one of triangle, square and hexagon, and all of them are formed into pillar. The reason why such a shape of cross section area is made is for efficiently increasing an opening rate of the ceramic member and controlling increase of pressure loss.

When the conventional ceramic honeycomb structural body is formed by assembling a plurality of pillar-shaped ceramic members (units)into one-piece, if an outer wall of the ceramic member is smooth, adhesive strength between the members is weakened, and adhesive portions are peeled off by vibration, pressure from exhaust gas and the like in use, resulting in deterioration of durability such that ceramic members are slipped or broken down.

The ceramic honeycomb structural body according to the embodiment of the present invention can effectively prevent the ceramic members from being displaced or slipping off each other in case of assembling and integrating a plurality of ceramic members by seal layers by making the cross section area perpendicular to the longitudinal direction at each end portion of the pillar-shaped porous ceramic member larger than that of the center portion of the member, durability as a filter and catalyst carrier are improved.

EXAMPLES

The present invention will be further explained in detail by referring to examples, but the present invention is not limited to these examples.

Figure 4:
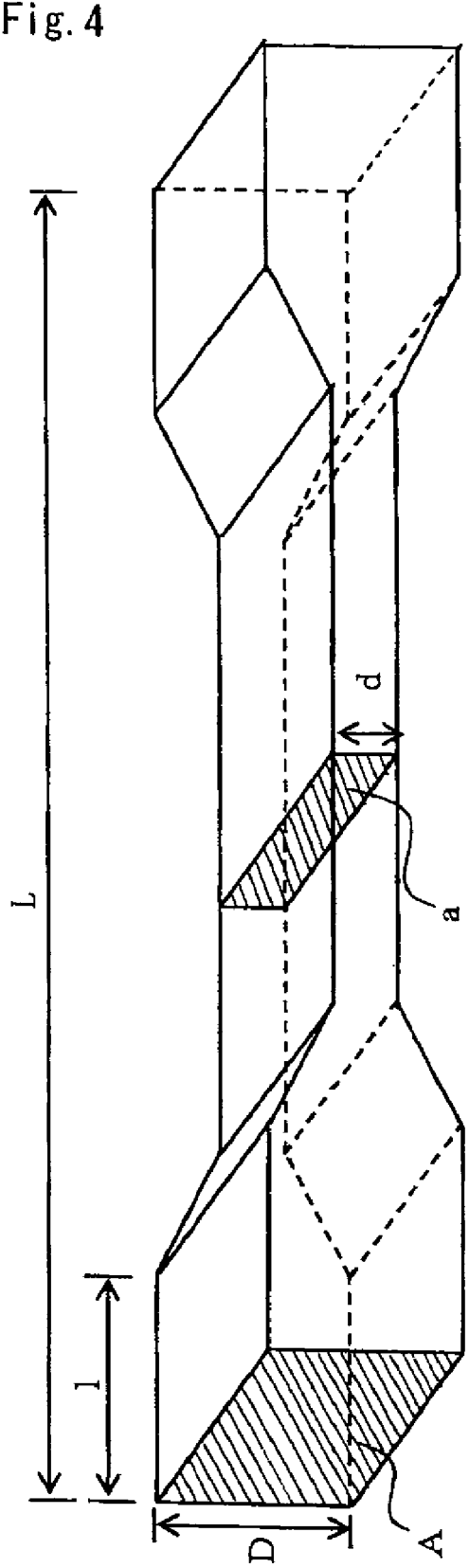
FIG. 4 is a schematic diagram of the porous honeycomb ceramic member used in an example of the present invention.

This example was conducted for confirming function and effect of the ceramic member given to a withstanding push strength (push strength resistance) by a ratio (2×l/L) of each end region length (2×l) to whole length (L) of the ceramic member and a ratio (A/a) of a cross section area(A)at each end portion to a cross section area (a) at the center portion of the ceramic member. A schematic diagram of the ceramic member used for the present example is shown in FIG. 4. Further, Examples 1 to 6 and Comparative Example 1 and 2 are collectively shown in Table 1. Besides, a method of manufacturing a ceramic member will be described as follows.

First, to raw material comprising 70 weight parts of silicon carbide raw material powder having about 22 μm of a mean particle diameter and 30 weight parts of silicon carbide raw material powder having about 0.5 μm of a mean particle diameter were added 5.7 weight parts of methyl cellulose as a molding assistant and mixed. Further, to the methyl cellulose-containing mixed powder were added 22.5 weight parts of a dispersing solvent comprising an organic solvent and water and admixed, and thereafter, extrusion molded with the use of a die for making a honeycomb form as an object, and a honeycomb molded body having numbers of through-holes (cells) was manufactured. Moreover, either one end portion of the through-hole (cell) was sealed with a checker pattern by using a plugging to obtain a raw molded body.

Next, the raw molded body was dried at 150° C., degreased at 300° C. and fired at 2200° C. under inert atmosphere, thereby obtaining samples (Nos. 1 to 8) of the ceramic member comprised of a silicon carbide based sintered body.

The above ceramic member is contracted to some extent when firing, so that with the use of a plugging having a smaller shrinkage percentage than that of a ceramic member (unit) for sealing the sealing portions at both ends can control shrinkage of both end portions when firing and enable the cross section areas of both end portions to make larger than that of the center portion area. Further, shrinkage percentages of the plugging and the ceramic member can be varied by adjusting ratio of organic solvent, particle diameter, mixing ratio of coarse powder to fine powder of silicon carbide raw material powder or the like. For instance, if a ratio of an organic solvent used for a plugging used for a sealing portion is made smaller than the amount used for base material, cross section areas of both end portions become larger than that of the center portion because of a small shrinkage percentage.

With respect to the ceramic honeycomb structural bodies (Examples 1 to 6, Comparative Examples 1 and 2) manufactured with these 8 kinds, withstanding push (push resistance) characteristics of the ceramic members were measured with the use of Instron universal material tester (MODEL 5582 type: made by Instron Co.) Concretely, 9 ceramic members (units) were assembled, integrated by using an adhesive paste including 30 mass % of alumina fiber having 20 μm of fiber length, 21 mass % of silicon nitride particle having 0.6 μm of mean particle diameter, 15 mass % of silica sol, 5.6 mass % of carboxymethyl cellulose and 28.4 mass % of water, and dried at 700° C. for 2 hours to manufacture ceramic honeycomb structural bodies. Among the completed ceramic honeycomb structural bodies, to one central ceramic member was only applied pressure by pressing a jig, and the pressure at the time of punching the ceramic member was measured as a withstanding push (push resistance) load. The results are shown in Table 1.

TABLE 1

|  | longitudinal length L (mm) of Ceramic member | Length l(mm) of end portion | 2l/L × 100 (%) | Height D(mm) of end portion | Cross section A(mm²) of end portion | Height d(mm) of central portion | Cross section a(mm²) of central portion | Ratio of cross sections A/a | Withstanding push strength (kgf) |
|---|---|---|---|---|---|---|---|---|---|
| Example 1 | 306 | 2 | 1.3 | 3.42 | 11.7 | 3.38 | 11.5 | 1.02 | 1081 |
| Example 2 | 305 | 5 | 3.3 | 3.42 | 11.7 | 3.33 | 11.1 | 1.05 | 1217 |
| Example 3 | 254 | 10 | 7.9 | 3.41 | 11.6 | 3.24 | 10.5 | 1.10 | 1183 |
| Example 4 | 256 | 15 | 11.7 | 3.42 | 11.7 | 3.38 | 11.4 | 1.03 | 1208 |
| Example 5 | 151 | 18 | 23.8 | 3.41 | 11.6 | 3.27 | 10.7 | 1.08 | 1195 |
| Example 6 | 149 | 1 | 1.3 | 3.41 | 11.6 | 3.32 | 11.0 | 1.05 | 1053 |
| Comparative Example 1 | 304 | 0 | 0 | 3.42 | 11.7 | 3.42 | 11.7 | 1.00 | 824 |
| Comparative Example 2 | 151 | 21.2 | 28.1 | 3.42 | 11.7 | 3.13 | 9.8 | 1.20 | 812 |

From the test results, Examples 1 to 6 are all within such ranges that the ratio (2×1/L) of each end region length to the whole length is 0.5 to 25%, and further that the ratio (A/a) between the end cross section area and the center cross section area is 1.01 to 1.10, so as to obtain high withstanding push strength (push strength resistance) of 1053 kgf or more. On the other hand, in Comparative Example, the ratio (A/a) between the end cross section area and the center cross section area is small such as 1.00, and in Comparative Example 2, the end region length (1) is large and further the ratio (A/a) between the end cross section area and the center cross section area is large such as 1.2 so as to make the withstanding push strength (push strength resistance) small such as 824 kgf or less in both Examples. Further, in Comparative Example 2, the withstanding push strength (push strength resistance) becomes small such as 312 kgf., thickness at the center portion of the seal layer is thick, and as a result, when a ceramic honeycomb structural body is manufactured, cracks are presumably generated in the seal layer by thermal expansion difference between the ceramic member and the seal layer.

What is claimed is:

1. A ceramic honeycomb structural body comprising an assembly formed by assembling and integrating a plurality of pillar-shaped porous honeycomb ceramic members, each member having numbers of cells juxtaposed in parallel to the longitudinal direction and defined by cell walls, wherein a cross section area perpendicular to the longitudinal direction at each end portion of the porous honeycomb ceramic member is made larger than that at the center portion in the longitudinal direction of the member, and wherein the cross section area at each end portion is about 1.01 times to about 1.10 times the cross section area at the center portion.

2. The ceramic honeycomb structural body according to claim 1, wherein an end region of each end portion of the member having a larger cross section area than that at the center portion is within a range of about 0.5% to about 25% length in the longitudinal direction from each end face.

3. The ceramic honeycomb structural body according to claim 1, wherein the ceramic member comprising at least one selected from aluminum nitride, silicon nitride, boron nitride, titanium nitride, silicon carbide, zirconium carbide, titanium carbide, tantalum carbide, tungsten carbide, alumina, zirconia, cordierite, mullite and aluminum titanate.

4. The ceramic honeycomb structural body according to claim 1, wherein shape of the cross section area at each end portion of the member is any one of triangle, square and hexagon.

5. The honeycomb structural body according to claim 1, wherein either one end portion of the cell is plugged for use in a filter for collecting and removing particulate substance contained in exhaust gas.

6. The ceramic honeycomb structural body according to claim 1, wherein a catalyst component comprising at least one noble metal selected from Pt, Pd and Rh, or alloy thereof is carried on the cell wall surface for use in a catalyst carrier to convert exhaust gas.

7. The ceramic honeycomb structural body according to claim 1, wherein the assembly includes a seal layer covering an outer surface of the assembled plurality of pillar-shaped porous honeycomb ceramic members.

8. The ceramic honeycomb structural body according to claim 1, wherein the plurality of pillar-shaped porous honeycomb ceramic members are adhered together by interposing seal layers provided in between adjacent ceramic members.

9. A ceramic honeycomb structural body comprising:
a ceramic block formed of a plurality of porous ceramic members, each porous ceramic member of the plurality of porous ceramic members having a plurality of cells extending in a longitudinal direction; and
a seal layer covering an outer surface of the ceramic block,
wherein a cross section area perpendicular to the longitudinal direction at each end portion of the porous ceramic member is larger than a cross section area perpendicular to the longitudinal direction at a center portion in the longitudinal direction of the porous ceramic member, and
wherein the cross section area at each end portion is about 1.01 times to about 1.10 times the cross section area at the center portion.

10. The ceramic honeycomb structural body according to claim 9, wherein an end region of each end portion of the porous ceramic member having a larger cross section area than that at the center portion is within a range of about 0.5% to about 25% length in the longitudinal direction from each end face of the porous ceramic member.

11. The ceramic honeycomb structural body according to claim 9, wherein the porous ceramic member comprising at least one selected from aluminum nitride, silicon nitride, boron nitride, titanium nitride, silicon carbide, zirconium carbide, titanium carbide, tantalum carbide, tungsten carbide, alumina, zirconia, cordierite, mullite and aluminum titanate.

12. The ceramic honeycomb structural body according to claim 9, wherein a shape of the cross section area at each end portion of the porous ceramic member is any one of a triangle, a square, and a hexagon.

13. The honeycomb structural body according to claim 9, wherein either one end portion of the cell is plugged for use in a filter for collecting and removing particulate substance contained in exhaust gas.

14. The ceramic honeycomb structural body according to claim 9, wherein a catalyst component comprising at least one noble metal selected from Pt, Pd and Rh, or alloy thereof is carried on the cell wall surface for use in a catalyst carrier to convert exhaust gas.

15. The ceramic honeycomb structural body according to claim 9, wherein the plurality of porous ceramic members are adhered together by interposing seal layers provided in between adjacent porous ceramic members.

* * * * *